(12) United States Patent
Reber

(10) Patent No.: US 7,604,256 B2
(45) Date of Patent: Oct. 20, 2009

(54) BAFFLING SYSTEM FOR EMERGENCY TANKER VEHICLE

(76) Inventor: Larry F. Reber, 6003 Fountain Nook Rd., Apple Creek, OH (US) 44606

( * ) Notice: Subject to any disclaimer, the term of this patent is extended or adjusted under 35 U.S.C. 154(b) by 288 days.

(21) Appl. No.: 11/163,040

(22) Filed: Oct. 3, 2005

(65) Prior Publication Data
US 2007/0096453 A1 May 3, 2007

(51) Int. Cl.
B60P 3/24 (2006.01)
B60P 3/22 (2006.01)

(52) U.S. Cl. ........................ 280/838; 280/834
(58) Field of Classification Search .............. 206/0.6, 206/335, 534.2, 593, 524.4; 105/358, 360; 296/15; D12/95; 114/75; 220/581, 582, 220/584, 734; 280/781, 784, 785, 830, 834, 280/837, 838, 839; 137/262, 267, 571, 574
See application file for complete search history.

(56) References Cited

U.S. PATENT DOCUMENTS

| 1,392,892 | A | | 10/1921 | Imber |
| 1,394,742 | A | | 10/1921 | Kramer |
| 1,462,347 | A | | 7/1923 | Kramer |
| 1,640,471 | A | | 8/1927 | Staley |
| 1,713,170 | A | | 5/1929 | Daviss |
| 1,909,734 | A | | 5/1933 | Thwaits |
| 2,000,819 | A | * | 5/1935 | Burkhardt .............. 105/360 |
| 2,011,161 | A | | 8/1935 | Robinson, Sr. |
| 2,036,607 | A | | 4/1936 | Robinson |
| 2,160,477 | A | | 5/1939 | Kramer |
| 3,131,949 | A | * | 5/1964 | Black ................... 280/837 |
| 3,187,766 | A | * | 6/1965 | Black ................... 137/267 |
| 3,310,070 | A | * | 3/1967 | Black ................. 137/637.1 |
| 3,715,034 | A | | 2/1973 | Ivanoff |
| 3,795,204 | A | * | 3/1974 | Waguespack ........... 105/358 |
| 4,251,005 | A | | 2/1981 | Sons et al. |
| 4,789,170 | A | | 12/1988 | Reber |
| 4,844,278 | A | | 7/1989 | Freiwald et al. |
| 4,951,704 | A | * | 8/1990 | Reber ................... 137/351 |
| 5,630,625 | A | * | 5/1997 | Shaw ................... 280/838 |
| 5,779,092 | A | | 7/1998 | Hehn et al. |
| 6,367,648 | B1 | * | 4/2002 | Boone et al. ............ 220/563 |
| 6,564,961 | B1 | | 5/2003 | Klein |
| 2002/0179611 | A1 | | 12/2002 | Hagenbuch |
| 2005/0189358 | A2 | * | 9/2005 | Hagenbuch ............ 220/563 |

FOREIGN PATENT DOCUMENTS

JP 08-198387 8/1996

* cited by examiner

Primary Examiner—Lesley D Morris
Assistant Examiner—Daniel Yeagley
(74) Attorney, Agent, or Firm—Hahn Loeser & Parks, LLP; Jason R. Strobel

(57) ABSTRACT

A baffling system for vehicle-mounted tanks is disclosed that reduces the concentration of vehicle destabilizing inertial forces of contained liquids caused by vehicle movements during transportation. The baffling system includes circular dish-shaped head baffles antipodally positioned with respect to each other, which attenuate forward and rearward directed liquid surges, and a plurality of longitudinal baffles that attenuate side-to-side liquid surges. The circular-shaped head baffles include removable cutouts for access to the tank compartments.

20 Claims, 6 Drawing Sheets

BAFFLING SYSTEM FOR EMERGENCY TANKER VEHICLE

TECHNICAL FIELD

This invention relates to a baffling system installed in truck-mounted tanks of emergency vehicles. More particularly, this invention relates to the installation of tank baffles designed to attenuate the inertial forces of liquids contained in such tanks produced by the abrupt movements of the vehicles on which such tanks are mounted. Specifically, this invention relates to a baffling system utilizing longitudinal baffles and transverse baffles wherein the transverse baffles incorporate a removable cutout portion allowing improved access for work in the tank when removed, and allowing reduced water flow through the passageway of the baffle when the cutout is installed. The combination of the restricted flow through the transverse baffles and the directed slosh protection of the longitudinal baffles substantially restricts water movement during high speed movement of the tanker, allowing better control of the vehicle.

BACKGROUND OF THE INVENTION

Tank trucks are widely used as emergency vehicles for transporting water to remote locations to battle a fire where local access to water may not be adequate or available. Fire tanker trucks used for carrying water commonly do so by drawing a supply of water from a local lake, river, or other body of water into the tank by vacuum, and then rushing to the scene of the fire where the water is unloaded into a temporary structure, the truck thereafter returning for additional water. In such service, the truck is operated at high speeds, frequently over uneven terrain, with partial loads, and with frequent sudden braking and turning. Since the tanks carried by such trucks are normally not completely filled, sudden surges of the water held therein are common.

Water has a liquid density of about 8.3 pounds per gallon, and a load weight of about 6 tons is typical for emergency tankers. The momentum of such loads, i.e., the product of the load's mass times its velocity, can be extremely high. As time is of the essence for emergency vehicles, the vehicles must travel quickly to their destination, often making quick starts, stops and abrupt turns. For example, in an abrupt stop of the emergency vehicle, the inertial forces created by the sudden shifting of the load can have a serious destabilizing effect on the vehicle. Such forces, including others generated by violent movements of the vehicle encountered in high speed operation, particularly over uneven surfaces, make it difficult to exercise control over the vehicle, with attendant risks of damage to the vehicle and its load, as well as injury to the driver and others who may be involved in the incident.

To avoid such destabilization, the tank can be filled to capacity; however, it is not always possible or desirable to carry full loads. An alternative expedient involves the installation of baffles in the interior of the tank positioned at right angles to the anticipated movement of the vehicle carrying it. Such baffles, in effect, form compartments within the tank, limiting the distance that the tank's cargo can shift, thus minimizing the build-up of liquid velocities, and thereby ameliorating the destabilizing effects that would otherwise occur. An example of such baffles is presented in co-owned U.S. Pat. No. 4,789,170, herein incorporated by reference.

While relatively successful, the baffles have several limitations. During turns, the transverse baffling has limited effect on the side-to-side movement of the water commonly referred to as sloshing. Sloshing also can result in destabilization of the vehicle. Another problem is related to the servicing of the tanks. It is often required that the interior of the tanks be inspected, cleaned, and/or treated with a protective coating to prevent corrosive effects of the water. In order to allow access, the baffling must have a cutout large enough for a person to pass to the compartments of the tank formed by the baffles. The cutouts allow flow of the water between compartments during operation of the tanker. The larger the cutout, the less effect the baffles will have in preventing destabilization of the vehicle.

The foregoing illustrates limitations known to exist in present baffle systems for tank trucks, especially for emergency vehicles. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

At least one disadvantage identified in the prior art is overcome by providing a fire tanker truck comprising: a generally cylindrical tank mounted on the truck, wherein a longitudinal axis of the tank is parallel to the truck's direction of locomotion; a plurality of circularly shaped head baffles mounted at right angles to, and spaced along the longitudinal axis of the tank; an access cutout formed in each head baffle; a door being removably fastened to each head baffle and at least partially covering the access cutout; and a vacuum pump connected to the tank for charging and discharging water.

BRIEF DESCRIPTION OF THE DRAWINGS

The invention will be better understood when reference is made to the following drawings, in which like numbers refer to like parts, and wherein.

DETAILED DESCRIPTION

Figure 1:
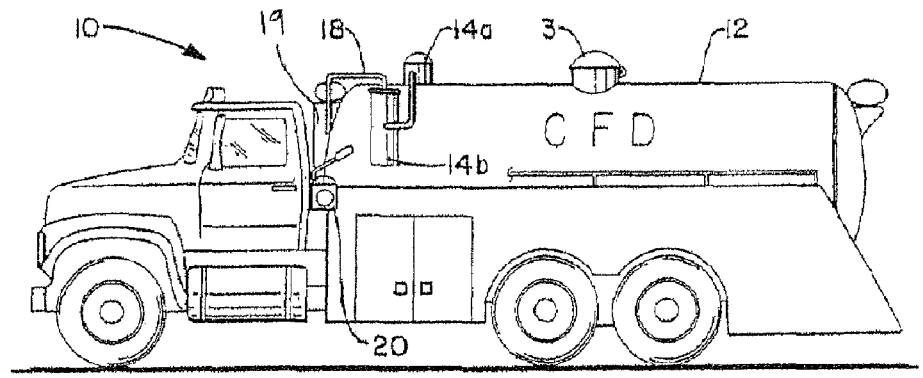
FIG. 1 is a side view of a vacuum type fire tanker truck.

FIG. 1 is a side view of a fire tanker truck, indicated generally by the numeral 10, comprising a water tank 12, equipped with a clean-out hatch 13. Tank 12 may be loaded, for example, by attaching a hose, one end of which is immersed in a convenient water source, for example, a pond, to fill valve 20. A vacuum is then drawn on the tank 12 with a vacuum pump, housed in an enclosure 19, attached to the tank through vacuum line 18. Water is prevented from being drawn into, and damaging the vacuum pump by means of safety check valves 14a and 14b, respectively.

Figure 2:
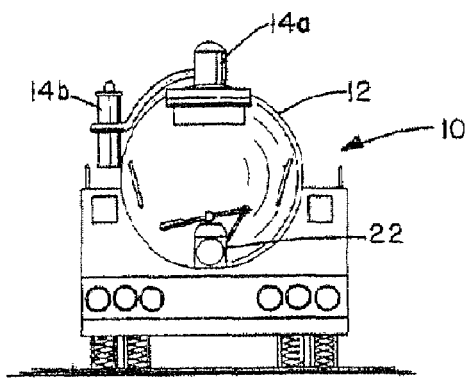
FIG. 2 is a rear end view of the fire tanker truck of FIG. 1.

FIG. 2 shows a rear end view of a fire tanker truck of FIG. 1 showing details of the truck 10, including tank 12, which may be emptied through discharge valve 22. Safety check valves 14a and 14b are also shown.

Figure 3:
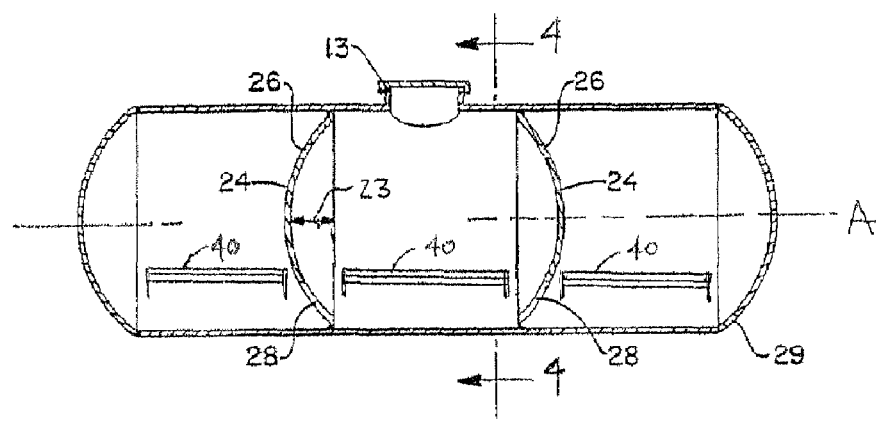
FIG. 3 is a cross-section of a tanker invention along its longitudinal axis, showing installed transverse and longitudinal baffles of the present invention.
Figure 4:
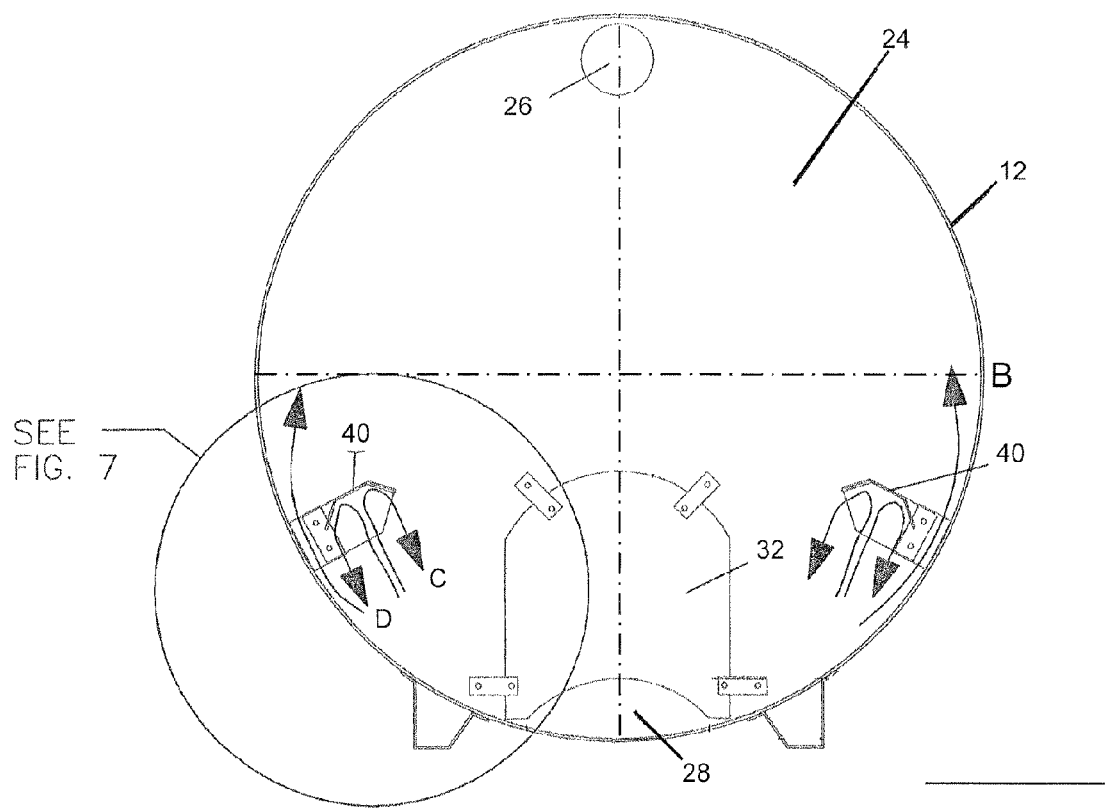
FIG. 4 is a cross-sectional view of FIG. 3, along line 4-4.

FIG. 3 shows a cross-section through tank 12 along its longitudinal axis, illustrating the baffles of the invention. In the Figure, tank 12 is shown with a clean-out hatch 13 and fitted with an external port 29, which is in communication with discharge valve 22. Tank 12 is fitted with a plurality of transverse baffles 24 commonly referred to as head baffles 24 and a plurality of longitudinal baffles 40. The head baffles 24 are circular, parabolic or dish-shaped members mounted at right angles to, and spaced along the longitudinal centerline axis A of the tank 12. The ratio of the depth 23 of the dished center of the head baffles 24 to their diameter is in a range from about 1 to 6 to about 1 to 10. The longitudinal baffles 40 are mounted on the interior sidewalls of the tank in a radial position generally below a horizontal plane through centerline axis B as shown in FIG. 4. The shape of the head baffles of the invention may vary considerably. For example, they may be conical, pyramidal, substantially parabolic, etc.; however, the use of dish-shaped internal baffles is especially efficient in attenuating the forward surge described here.

Figure 5:
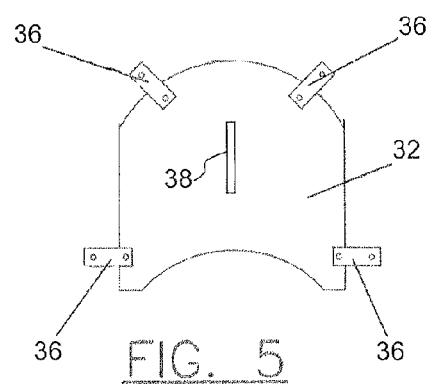
FIG. 5 is an exploded perspective view of a transverse baffle and access door of the present invention.
Figure 6:
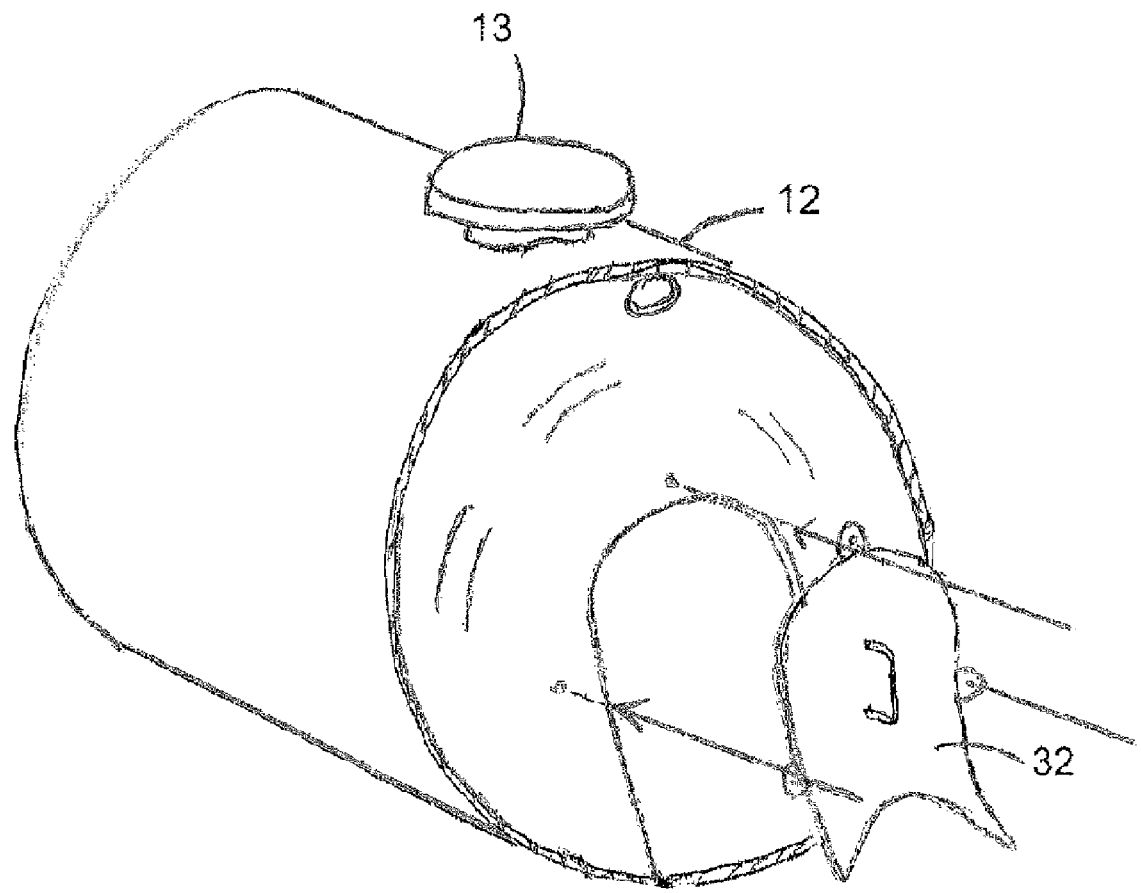
FIG. 6 is a front view of a removable access door from a transverse baffle of the present invention.

Referring now to FIGS. 4 and 5, the head baffles 24 include a removable access door 32, at least partially covering an access cutout 34 such that when access door 32 is removed, a person can pass through the access cutout 34 to maintain or inspect the tank. In one embodiment, access door 32 includes a handle 38 and one or more tabs 36, through which bolts, screws, or other removable fasteners affix the access door 32 to the head baffle 24. When fastened, the access door 32 is rigidly and securely affixed to the head baffle 24 through tabs 36. The door 32, when rigidly and securely fastened to the head baffle 24, operates as a functional part of the baffle to withstand the strong forces of the liquid moving within the tank 12. Access door 32 is sized to cover all or a portion of access cutout 34 when access door 32 is installed on the head baffle 24. In FIG. 6, it is shown that the door 32 conforms to the dished shape of the head baffle 24.

In one embodiment, access cutout 34 has a rounded shape at the top. Rounded cutout shapes reduce stress in the head baffle, whereas square cutouts may result in areas of increased stress in the head baffle. The size of access cutout 34 may be varied to accommodate the passage of different sized persons. In one embodiment, access cutout 34 through the head baffle 24 is large enough to allow an average-sized person to comfortably pass through when access door 32 is removed. In this embodiment, access cutout 34 has an area of approximately 415 square inches. Smaller cutouts that accommodate small or skinny persons may also be used, however, larger cutout areas make passage easier and faster. Easier passage through the access cutout 34 reduces accidents and injury when workers are inside the tank for maintenance or inspection, and speeds emergency response if there is an accident inside the tank.

Although some form of bracket arrangement can be employed to fasten head baffles 24 to tank 12, in view of the considerable forces involved, it has been found desirable to secure the head baffles of the invention to the tanks in which they are mounted by means of welding.

Referring again to FIGS. 3 and 4, the head baffles 24 are fitted with equalizer ports 26 for the purpose of equalizing pressure in the tank on both sides of the baffles, and water transfer ports 28 that allow liquids to be moved from area-to-area within the tank. The water transfer port 28 allows water to flow from one side of the head baffle 24 to the other. The most efficient location for the water transfer port 28 is along the lowest edge of the head baffle such that the baffle does not trap water. In one embodiment, the water transfer port 28 is an aperture through the head baffle, separate and away from the access cutout 34 (not shown). In another embodiment, the access door 32 comprises an aperture functioning as the water transfer port 28 when access door 32 is installed on the head baffle 24 (not shown). In yet another embodiment, the water transfer port 28 is a gap between a lower edge of the access door 32 and the wall of the tank 12 when access door 32 is installed on the head baffle 24, as is shown in FIG. 4.

While the dimensions of the water transfer port 28 and equalizer port 26 are not critical, it is important in the case of a fire engine, for example, that the tank be capable of rapid loading or unloading. As water filling the tank passes through the water transfer port 28, the dimensions selected should permit liquids to flow past the head baffles 24 quickly and easily. In this regard, the size of the water transfer port 28 may be larger than the cross-sectional area of the intake and discharge piping. In one embodiment, the water intake and discharge pipes are 6 inch diameter pipes, which have a cross-sectional area of approximately 28.3 square inches. In this embodiment, the water transfer port 28 is larger than 28.3 square inches to allow liquid to pass through the water transfer ports 28 as quickly as it is pumped in or out of the tank. This ability to limit the size of the water transfer port is a significant advantage over the prior art where the water transfer port had to be large enough for a person to pass through. When the water transfer port is large enough for a person to pass through, the head baffle loses effectiveness because liquid sloshes through the large water transfer port instead of being attenuated against the head baffle.

An equalizer port 26 having a diameter of from about 4 inches to 8 inches, usually about 6 inches, is adequate for pressure equalization purposes. The shapes of the water transfer port 28 and equalizer ports 26 may be circular or may be any other shape.

Figure 7:
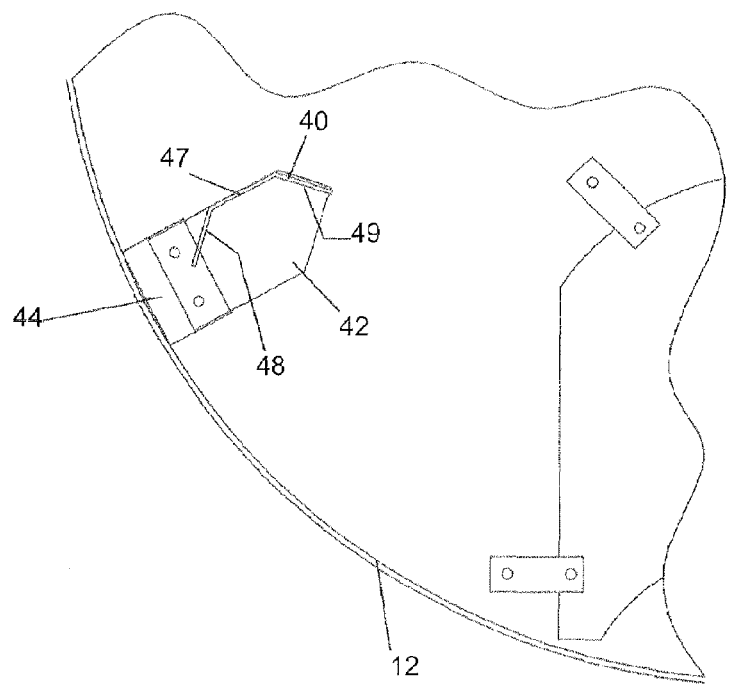
FIG. 7 is a partial cross-sectional view of FIG. 4.
Figure 8:
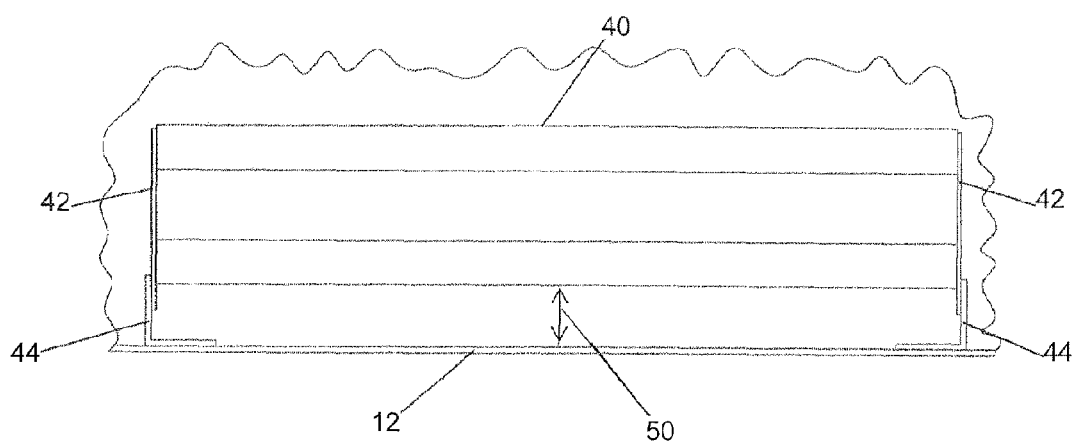
FIG. 8 is a cross-sectional view of FIG. 6, along line 7-7.
Figure 9:
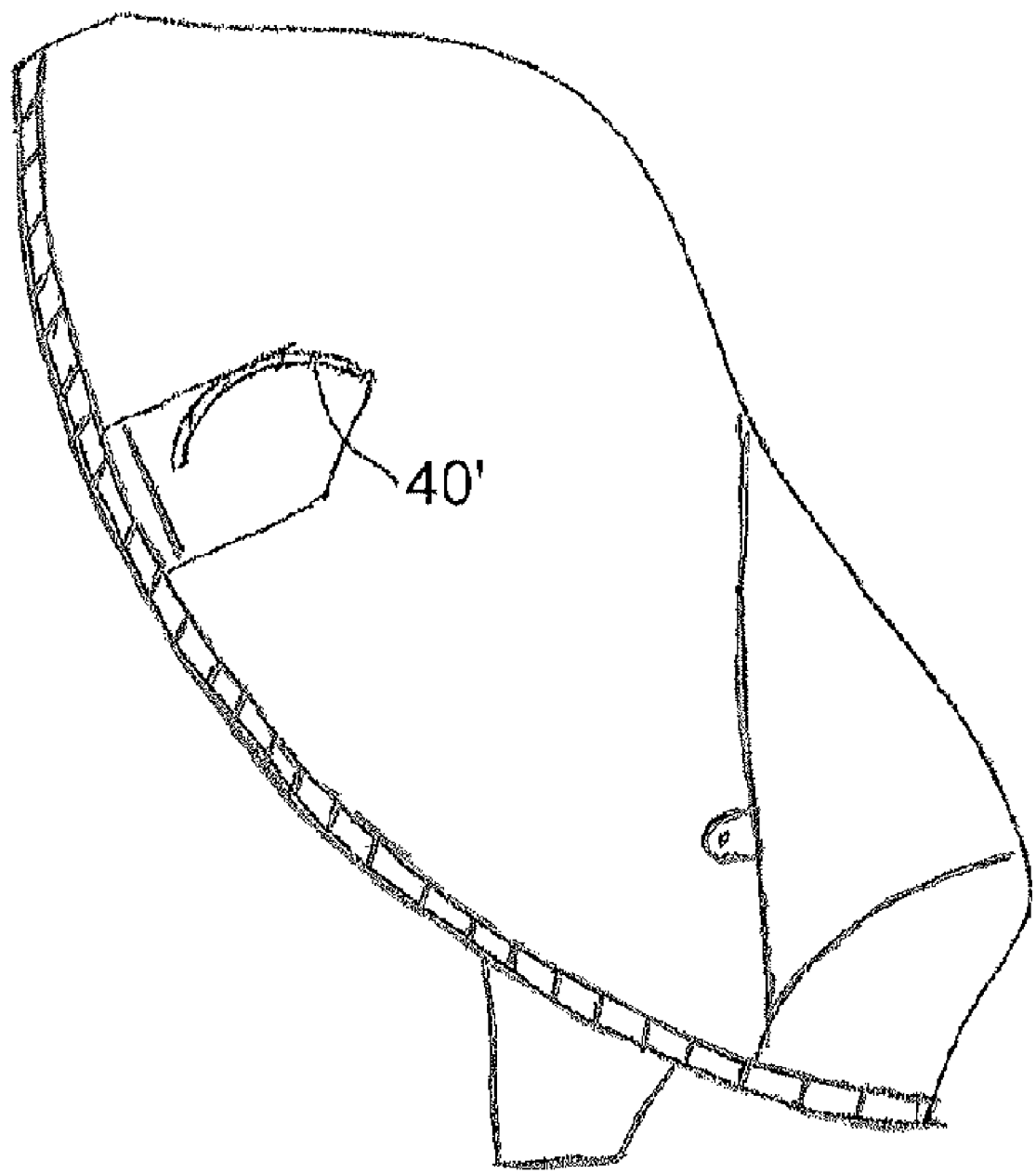
FIG. 9 is a partial cross-sectional view of FIG. 4, illustrating a longitudinal baffle having an arcuate cross section.

The longitudinal baffles 40 are best shown in FIGS. 7 and 8. Longitudinal baffles 40 comprise end portions 42 that are mounted to the interior wall of the tanks by brackets 44. The longitudinal baffles 40 are configured to stop the advancing water and redirect it back toward its source such that the inertial movement of the water is attenuated. In the embodiment shown, the longitudinal baffle 40 comprises a longitudinal first plate portion 47 between two angled plate portions 48, 49. The longitudinal baffle 40 is mounted such that side slosh hits the first plate portion 47 at a generally perpendicular angle. The water is then redirected by the angled plate portions 48, 49, back upon itself as best shown by arrows C and D in FIG. 4. The angle shown between the first plate portion 47 and the angled plate portions 48, 49 is 135 degrees, however, the invention is not limited to a particular angle. It is also contemplated that the longitudinal baffle 40' could be configured with a cross-section in the form of a full or partial radius as illustrated in FIG. 9. For example, the first plate portion could be a longitudinal flat plate between two arcuate portions. The present invention is not intended to be limited to a particular cross-sectional form for the baffles. The longitudinal baffles 40, 40' can be any shape that effectively attenuates the side slosh.

It is noted that the longitudinal baffle 40 is shown radially spaced from the side of the tank 12 as represented by radial spacing 50 in FIG. 8. This spacing prevents water from being trapped between the tank 12 and the longitudinal baffle 40. The longitudinal baffle 40 is intended to prevent major surges of water moving laterally in the tank 12. It is contemplated that the radial spacing 50 can be adjusted to optimize the effectiveness of the longitudinal baffle 40.

Figure 10:
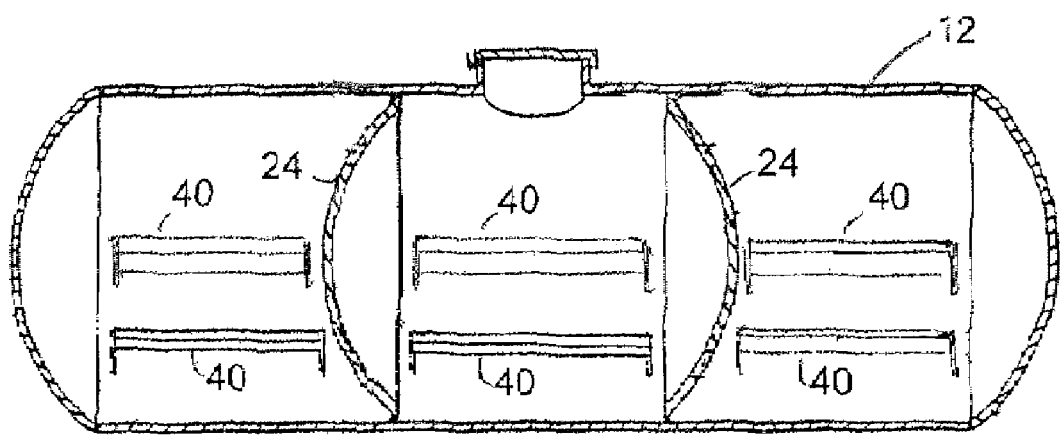
FIG. 10 is a cross-section of a tanker invention along its longitudinal axis, showing multiple rows of longitudinal baffles.

The angular position of the longitudinal baffle 40 is shown 10 to 12 degrees below the horizontal centerline axis B of the tank 12 in FIG. 7. It is contemplated that longitudinal baffles 40 could be located lower on the tank wall to check side slosh at lower tank fill levels. It is also contemplated that the longitudinal baffles 40 could be located higher on the tank wall. In alternate embodiments, more than one row of longitudinal baffles 40 is positioned on the tank wall, one row being positioned lower on the wall than other rows as illustrated in FIG. 10. The number of baffles employed will naturally depend upon factors such as the length of the tank, the nature of the liquids to be carried, the vehicular speed anticipated, and similar considerations. The present invention is not limited to a particular number or positioning of the longitudinal baffles 40 or head baffles 24.

Dimensions of the tank and the transverse and longitudinal baffles may vary; however, generally such components will have a thickness of about from $3/16$ inch to $3/8$ inch, about $1/4$ inch being common. Similarly, the diameter of the tank 12 may be varied widely, depending upon the service to which the tank is to be put and, therefore, the volume required. Generally, in fire tanker trucks, the tank diameter will vary from about 54 inches to 84 inches, with tanks of about 66 inches being common.

While the head cross-sections of the tanks and, therefore, the head baffles illustrated in the various figures have been shown as round, other shapes may also be employed, for example, elliptically shaped tanks. The use of the baffles of the invention with circular tanks, however, is particularly effective for various reasons including, but not limited to, the fact that force components produced by the parabolic angularity on opposite sides of circular perimeters on the surface of such baffles are substantially balanced.

The head baffles 24 and longitudinal baffles 40 operate together as a system. When the tanker truck 10 brakes rapidly, the symmetrical, dish-shaped head baffles 24 of the present invention tend to break up and dissipate the forward-moving liquid surges. The longitudinal baffles 40 assist in checking the edges of the forward surge. When the tanker truck 10 turns or changes direction, the longitudinal baffles 40 check the side surges within the tank. The longitudinal baffles 40 are especially important when the tank is carrying less than a half load.

Another benefit of the baffle system 10 of the present invention is mobility of a worker in the tank for maintenance or inspection. Longitudinal baffles of the prior art configured to check side slosh often include large straight baffles through the center of the tank and running the length of the tank. In these prior art baffle systems, cutouts are placed through the baffles for workers to crawl through; however, these cutouts are difficult to maneuver, and the presence of the large cutouts naturally reduces the effectiveness of the head baffle. The baffle system of the present invention, conversely, allows worker mobility through the center of the tank, increasing worker safety, while improving side slosh reduction in operation.

The baffling system of the type described greatly minimizes control problems caused by surges of the liquids being transported, and the baffling system may be used not only for fire tank trucks carrying water, but also those used for transportation of any type of liquid substances ranging, for example, from milk to gasoline. The baffles of the invention have been found to be particularly useful, however, in controlling liquid surges in fire trucks because of the difficult service conditions experienced by such vehicles, including partial loads, high speeds, roughened road surfaces, and the like. Normally fire tanker trucks involve tanks having volumes of from about 1,500 to 4,500 gallons; however, the baffles described are not limited to such capacities.

While this invention has been described with reference to preferred embodiments thereof, it shall be understood that such description is by way of illustration and not by way of limitation. Accordingly, the scope and content of the present invention are to be defined only by the terms of the appended claims.

What is claimed is:

1. A fire tanker truck comprising:
   a generally cylindrical tank mounted on the truck, wherein a longitudinal axis of the tank is parallel to the truck's direction of locomotion;
   a plurality of circularly shaped head baffles mounted at right angles to, and spaced along the longitudinal axis of the tank;
   an access cutout formed in each head baffle;
   a door being removably fastened to each head baffle and partially covering the access cutout, wherein a single water transfer port is at least partially formed by a portion of the access cutout not covered by the door, the water transfer port being at least partially formed by the bottom of the tank and the bottom of the door along the lowest edge of the head baffle;
   a vacuum pump connected to the tank for charging and discharging water; and
   a plurality of longitudinal baffles mounted parallel to the longitudinal axis of the tank, wherein the plurality of longitudinal baffles are positioned below a horizontal plane through a center of the tank.

2. The fire tanker truck according to claim 1 further comprising a plurality of brackets affixed to the door, wherein the door is fastened to the head baffle by a plurality of threaded fasteners each positioned through an aperture in the brackets.

3. The fire tanker truck according to claim 1, wherein the head baffles are dish shaped.

4. The fire tanker truck according to claim 3, wherein the door conforms to the dish of the head baffle.

5. The fire tanker truck according to claim 1, wherein each longitudinal baffle is mounted between two end plates, wherein each end plate is mounted to an interior wall of the tank.

6. The fire tanker truck according to claim 1, wherein each longitudinal baffle is positioned a radial distance away from an interior wall of the tank.

7. The fire tanker truck according to claim 1, wherein each longitudinal baffle is adapted to attenuate fluid slosh within the tank.

8. The fire tanker truck according to claim 1, wherein each longitudinal baffle comprises a first portion positioned generally perpendicular to a slosh movement direction and at least a second portion adjacent to the first portion positioned to redirect a slosh back toward a bottom of the tank.

9. The fire tanker truck according to claim 1, wherein at least a portion of a lateral cross-section of the longitudinal baffle is arcuate.

10. The fire tanker truck according to claim 1, wherein each head baffle comprises a pressure equalizing port located near a top of the head baffle.

11. A fire tanker truck comprising:
   a generally cylindrical tank mounted on the truck, wherein a longitudinal axis of the tank is parallel to the truck's direction of locomotion;
   a plurality of longitudinal baffles mounted parallel to the longitudinal axis of the tank, wherein the plurality of longitudinal baffles are positioned below a horizontal plane through the center of the tank;

at least two circularly shaped head baffles mounted at right angles to, and spaced along the longitudinal axis of the tank;

an access cutout formed in each head baffle;

a door partially covering the access cutout in each head baffle, wherein a water transfer port is formed by a portion of the access cutout not covered by the door, the water transfer port being at least partially formed by the bottom of the tank and the bottom of the door along the lowest edge of the head baffle; and a vacuum pump connected to the tank for charging and discharging water, the vacuum pump being in fluid communication with each water transfer port.

12. The fire tanker truck according to claim 11, wherein each longitudinal baffle comprises a longitudinal first plate portion positioned between two angled plate portions; wherein the longitudinal baffles are mounted between two end plates; wherein each end plate is adapted to mount to an interior wall of the tank.

13. The fire tanker truck according to claim 11, wherein the head baffles are dish shaped and the doors conform to the dish shape of the head baffles.

14. The fire tanker truck according to claim 11, wherein at least a portion of a lateral cross-section of the longitudinal baffle is arcuate.

15. The fire tanker truck according to claim 11, wherein each head baffle comprises a pressure equalizing port located near a top of the head baffle.

16. A fire tanker truck comprising:

a generally cylindrical tank mounted on the truck, wherein a longitudinal axis of the tank is parallel to the truck's direction of locomotion;

a plurality of longitudinal baffles mounted parallel to the longitudinal axis of the tank, wherein the plurality of longitudinal baffles are positioned below a horizontal plane through the center of the tank, further wherein each longitudinal baffle is positioned a radial distance away from an interior wall of the tank;

at least two circularly shaped head baffles mounted at right angles to, and spaced along the longitudinal axis of the tank;

an access cutout formed in each head baffle;

a door partially covering the access cutout in each head baffle, wherein a water transfer port is formed by a portion of the access cutout not covered by the door, the water transfer port being at least partially formed by the bottom of the tank and the bottom of the door along the lowest edge of the head baffle; and a vacuum pump connected to the tank for charging and discharging water, the vacuum pump being in fluid communication with each water transfer port.

17. The fire tanker truck according to claim 16, wherein each longitudinal baffle comprises a longitudinal first plate portion positioned between two angled plate portions; wherein the longitudinal baffles are mounted between two end plates; wherein each end plate is adapted to mount to an interior wall of the tank.

18. The fire tanker truck according to claim 16, wherein the head baffles are dish shaped and the doors conform to the dish shape of the head baffles.

19. The fire tanker truck according to claim 16, wherein at least a portion of a lateral cross-section of the longitudinal baffle is arcuate.

20. The fire tanker truck according to claim 16, wherein each head baffle comprises a pressure equalizing port located near a top of the head baffle.

* * * * *

UNITED STATES PATENT AND TRADEMARK OFFICE
CERTIFICATE OF CORRECTION

PATENT NO. : 7,604,256 B2  Page 1 of 1
APPLICATION NO. : 11/163040
DATED : October 20, 2009
INVENTOR(S) : Larry F. Reber It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 288 days.

should read (*) Notice: Subject to any disclaimer, the term of this patent is extended or adjusted under 35 U.S.C. 154(b) by 500 days.

Signed and Sealed this

Eleventh Day of May, 2010

David J. Kappos
*Director of the United States Patent and Trademark Office*